March 27, 1928.

W. J. GAGNON 1,664,290

COUPLING FOR BEAD CHAINS

Filed June 25, 1927

Inventor:
WILLIAM J. GAGNON
By his Attorneys

Patented Mar. 27, 1928.

1,664,290

UNITED STATES PATENT OFFICE.

WILLIAM J. GAGNON, OF BRIDGEPORT, CONNECTICUT, ASSIGNOR TO THE BEAD CHAIN MANUFACTURING COMPANY, OF BRIDGEPORT, CONNECTICUT, A CORPORATION OF CONNECTICUT.

COUPLING FOR BEAD CHAINS.

Application filed June 25, 1927. Serial No. 201,539.

My invention relates to a coupling, and particularly to a coupling for use with bead chains.

In the accompanying drawings—

Figure 1:
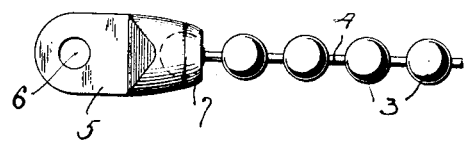
Figure 2:
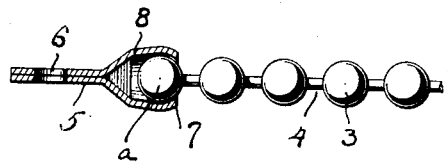

Fig. 1 is a plan view of a coupling in which my invention is embodied in one form; and Fig. 2 is a side elevation at right angles thereto, the coupling member being shown in section.

The present coupling is primarily intended for use in connections with bead chains comprising balls 3 flexibly interconnected by dumbbell links 4 and made from strip sheet metal in accordance with the teachings of the Goodridge & Gagnon Patent No. 1,087,876, February 17, 1914.

The coupling member to which my invention relates is formed from seamless tubing flattened at one end to afford a double wall plate 5, apertured at 6 to accommodate a jump ring. The opposite end of the tube blank accommodates the end ball $a$ of the chain. After the ball is inserted, the end of the tube is rolled inward to form a detaining flange 7. The ball is thus permanently engaged within the chamber 8.

Preferably the internal diameter of the tube blank is substantially that of the overall diameter of the chain balls 3. Consequently the engagement of the ball $a$ within the chamber 8 of the coupling reinforces the ball. This is of value when the ball is split, as is the product of the patent above mentioned, since stresses applied to the coupling cause the dumbbell links to exert a spreading effort on the ball. When closely engaged by the walls of the chambers 8, the ball $a$ cannot be spread.

The coupling is readily manufactured and easily applied to the chains, to which it is permanently affixed by the formation of the flange 7.

I claim as my invention—

1. A coupling for chains of the split bead type, comprising a length of seamless tubular stock collapsed at one end to form a double walled plate, apertured to accommodate a jump ring, the other end of the tube having an internal diameter only slightly in excess of the overall diameter of the ball and accommodating the end ball of a chain, said end of the blank being offset inward to detain the ball against escape.

2. The combination of a bead chain end ball, with a coupling device, comprising a seamless tube in one end of which said ball is accommodated and engaged by the offset margin of said tube end, the opposite end of said tube being collapsed to form a double wall plate apertured to accommodate a jump ring.

In testimony whereof I have signed my name to this specification.

WILLIAM J. GAGNON.